United States Patent [19]
Davy

[11] Patent Number: 5,808,821
[45] Date of Patent: *Sep. 15, 1998

[54] METHOD FOR ELIMINATING FILE FRAGMENTATION AND REDUCING AVERAGE SEEK TIMES IN A MAGNETIC DISK MEDIA ENVIRONMENT

[75] Inventor: William Davy, Dublin, Ohio

[73] Assignee: Axent Technologies, Inc., Rockville, Md.

[*] Notice: The term of this patent shall not extend beyond the expiration date of Pat. No. 5,398,142.

[21] Appl. No.: 402,451

[22] Filed: Mar. 10, 1995

Related U.S. Application Data

[63] Continuation of Ser. No. 359,316, May 31, 1989, Pat. No. 5,398,142.

[51] Int. Cl.⁶ .................................................. G11B 5/09
[52] U.S. Cl. ............................................. 360/48; 395/622
[58] Field of Search .......................... 360/48, 39; 369/13, 369/15, 83, 84, 32, 59; 358/311; 386/4, 52, 64; 395/404, 622, 825

[56] References Cited

U.S. PATENT DOCUMENTS

| | | | |
|---|---|---|---|
| 4,827,462 | 5/1989 | Flannagan et al. | 369/32 |
| 5,398,142 | 3/1995 | Davy | 360/48 |

OTHER PUBLICATIONS

System Performance House, Inc., "DOPTER", (Version 1 – RSTS/E Version 7.0–7.2) The Finest RSTS/E Disk Optimizing Program Available (Date Unavailable).

"Mastering DOS" 2nd Ed., Judd Robbins 1987, pp. 484–488.

"Getting Started with the IBM PC and XT", David Arnold and the Editors at PC World 1984, p. 54.

William R. Devy, System Performance House, Inc., "RSTS/E Disk Optimization In A Multi–User Environment," *RSTS Professional*, Jun., 1983, pp. 8, 10, 12, 14,16, 18, and 30.

PC Tools Deluxe, Version 5, Central Point Software, Inc., Dec., 1988, Table of Contents and pp. 87–113 and 191–223.

*Primary Examiner*—Aristotelis M. Psitos
*Assistant Examiner*—Alan Faber
*Attorney, Agent, or Firm*—Baker & Botts, L.L.P.

[57] ABSTRACT

In accordance with the present invention, a method of intelligently organizing a magnetic storage medium is provided. The magnetic storage medium has free space and a plurality of files distributed thereon. The plurality of files includes volatile files created within a first predetermined period of time. First, the free space is substantially consolidated on the magnetic storage medium. Then, the volatile files are substantially positioned contiguous to the consolidated free space.

11 Claims, 7 Drawing Sheets

| 0 | V | F | I | D | O | W |
|---|---|---|---|---|---|---|
| ~0-10 | ~11-50 | ~51-100 | 96-105 | 106-115 | ~116-150 | ~151-200 |

= IMMOVABLE

~ =

I=INDEX
O=ORDINARY
V=VOLATILE
W=WAREHOUSE
F=FREE SPACE
D=DIRECTORY

FIG. 8

| 9 | 4 | 8 | 2 | F | | 6 | 10 | | 5 | 3 | 7 | 1 |
|---|---|---|---|---|---|---|---|---|---|---|---|---|
| O | V | V | V | F | D | O | O | F | W | W | W | W |
| 1-8 | 9-17 | 18-25 | 26-48 | 49-95 | 106-115 | 116-132 | 133-147 | | 151-161 | 162-168 | 169-185 | 186-200 |

I=INDEX
O=ORDINARY
V=VOLATILE
W=WAREHOUSE
F=FREE SPACE
D=DIRECTORY

▨ = IMMOVABLE

METHOD FOR ELIMINATING FILE FRAGMENTATION AND REDUCING AVERAGE SEEK TIMES IN A MAGNETIC DISK MEDIA ENVIRONMENT

This application is a continuation of application Ser. No. 07/359,316, filed May 31, 1989 entitled "METHOD FOR ELIMINATING FILE FRAGMENTATION AND REDUCING AVERAGE SEEK TIMES IN A MAGNETIC DISK MEDIA ENVIRONMENT" and now U.S. Pat. No. 5,398, 142.

BACKGROUND OF THE INVENTION

The present invention generally relates to the field of electronic computer systems, and more particularly, to a method of maintaining the contiguity of files stored on magnetic disks and positioning those files in a manner that reduces the average seek time for read and write accesses to the disk. Although this method was developed for mass storage peripherals connected to Digital Equipment Corporation VAX® computers running the VMS® operating system, the method is not limited in this respect and is broadly applicable to mass storage devices on other hardware platforms. VAX and VMS are registered trademarks of Digital Equipment Corporation.

In the course of normal data processing operations, data, in the form of files, are created and deleted on magnetic disk media. Generally, the operating system of the computer attempts to create new files contiguously on the disk. However, as the disk fills and less free space is available, it becomes highly likely that the contiguity of files cannot be maintained. When this happens, the operating system will search for the largest pieces of available free space and will allocate space in this sequence until the entire file is created. The net result is that files become fragmented, i.e., in several "pieces" on the disk. Conversely, as files are deleted, it creates more "holes" of free space. As contiguous free space deteriorates, the problem of contiguous file creation is exacerbated.

File fragmentation is undesirable. Under the VMS operating system, each disk contains an index file designated INDEXF.SYS that specifies the location of all files on the disk. When a file is to be accessed, an initial access is made to the appropriate block (512 character aggregate of disk space) in the index file. This block tells the operating system the address of the target file. If the target file is fragmented, the heads on the disk will have to make multiple accesses (I/O's) to read the entire file. In cases of extreme fragmentation, another access must be made to the index file to get the addresses for additional pieces of the file. This is called a "window turn" and requires significant CPU resources as well as multiple I/O's. As I/O's increase and window turns utilize CPU cycles, overall performance on the system is degraded, resulting in I/O bottlenecks, reduced productivity, and a deterioration of terminal response time for interactive users.

VMS systems offer one solution to the file fragmentation problem. This solution entails doing an indexed backup to tape of the entire disk, re-initializing the disk, and restoring the disk from the tape. This will be referred to below as the backup model. As FIG. 6 illustrates, all of the free space lands at the back (high logical block number (LBN)) end of the disk. As files are created and deleted, the disk quickly degenerates to its former state. The defragmentation of the disk using tape backups is labor-intensive and time consuming, taking up to four hours for a 456 Mb disk.

Many commercial products attempt to address and overcome the problem of file fragmentation. One such product is PC Tools Deluxe™ by Central Point Software, Inc. The software package includes a feature which arranges the files on a hard disk or diskette such that each file is contained in one contiguous area. Another feature unfragments files and moves free space to the back of the disk. The software also permits files to be arranged in a predetermined manner on the hard disk. For example, all files for a given subdirectory may be kept together to keep data and program overlay files adjacent one another. This reduces the amount of disk head movement needed. A directory sort feature permits the files within directories to be sorted by file name, file time, file extension, or file size. Information regarding these features may be found in PC Tools Deluxe, Version 5, December 1988. However, this and similar products arrange free space at the back of the disk. As described above, as files are created and deleted, contiguous free space deteriorates and the fragmentation problems return.

The above techniques may be illustrated as in FIG. 1. FIG. 1 illustrates a disk having a plurality of files (designated H in the Figure) and free space (designated F) arranged as shown. If a new file is created, it may be necessary to write the file to two or more non-contiguous blocks of free user space, resulting in file fragmentation. File fragments FR1, FR2, and FR3 represent a file written to three non-contiguous blocks of free space. The heads on the disk will have to access each of the fragments FR1, FR2, and FR3, resulting in degraded system performance. The above-described systems for unfragmenting files will result in disk arranged as illustrated in FIG. 2. However, as files are deleted and written to the free space, fragmentation again occurs and system performance is degraded.

SUMMARY OF THE INVENTION

Accordingly, it is an object of the present invention to provide an online method and apparatus for eliminating fragmentation without need for performing backup and restore via tape.

It is a further object of the present invention to recognize different file types on the disk and group them intelligently in a manner that will minimize the average seek time to complete an I/O.

These objects are achieved in accordance with the present invention by providing a file movement algorithm that can recognize a file by its usage characteristics and position it on the disk in a contiguous state without the need for operator intervention.

The major benefits of the invention are (1) operators need no longer be present to mount backup and restore tapes related to disk defragmentation; (2) average seek time is reduced due to intelligent file placement; (3) productivity increases due to elimination of I/O bottlenecks resulting from multiple seeks.

In accordance with the present invention, a method of intelligently organizing a magnetic storage medium is provided. The magnetic storage medium has free space and a plurality of files distributed thereon. The plurality of files includes volatile files created within a first predetermined period of time. First, the free space is substantially consolidated on the magnetic storage medium. Then, the volatile files are substantially positioned contiguous to the consolidated free space.

BRIEF DESCRIPTION OF THE DRAWINGS

A more complete appreciation of the present invention and many of the attendant advantages thereof will be readily obtained as the invention becomes better understood through the following detailed description with reference to the accompanying drawings.

FIG. 8 illustrates the files of FIG. 3 arranged in accordance with the present invention.

DESCRIPTION OF THE PREFERRED EMBODIMENT

A simple example will serve to demonstrate the operation of the present invention. It should be recognized that the example below is illustrative only and the invention is not limited in this respect. The important aspect of the present invention is the differentiation of file types on the disk.

Assume that a disk includes 200 disk blocks and that during an initialization scan described in greater detail below, the disk is found to contain files as follows:

TABLE I

| | |
|---|---|
| Warehouse (W) | 50 disk blocks |
| Index (I) | 10 disk blocks |
| Free (F) | 50 disk blocks |
| Volatile (V) | 40 disk blocks |
| Directory (D) | 10 disk blocks |
| Ordinary (O) | 40 disk blocks |

In accordance with the present invention, warehouse files, i.e., those files which have not been accessed for a first predetermined number of days, are migrated or moved to the back portion (LBN high) of the disk. Thus, in this example, disk blocks 151–200 would hold warehouse files. Typically, warehouse files are the least likely files to be accessed, and thus disk blocks 1–150 constitute what will be referred to below and is illustrated in the figures as the "actively accessed region". The present invention attempts to substantially center the free space within this actively accessed region. Thus, to the extent possible, the free space will be positioned at disk blocks 51–100 in the above example.

While in a preferred embodiment, warehouse files are migrated to the back of the disk, the invention is not limited in this respect. Warehouse files may also be migrated to the front portion (LBN low) of the disk and the placement of the files would be inverted. Thus, utilizing the above example, if warehouse files were migrated to the front portion of the disk, blocks 1–50 would hold warehouse files and disk blocks 51–200 would constitute the actively accessed region.

An important feature of the present invention is that the volatile files are positioned contiguous to the free space. Volatile files are statistically the most likely files to be accessed and deleted, and since new file creations will occur in free space, the read/write head movement may be further localized or focused by concentrating its activity in one area of or portion the disk. This region is denoted "focused" in FIG. 5.

The present invention will be explained in detail with reference to the sample file directory of Table II.

TABLE II

| Name | Size | Date Created |
|---|---|---|
| File 1 | 15 | Feb. 23 - 12:14 |
| File 2 | 23 | Dec. 11 - 16:42 |
| File 3 | 7 | Apr. 05 - 1:10 |
| File 4 | 9 | Dec. 13 - 20:32 |
| File 5 | 11 | Mar. 14 - 22:17 |
| File 6 | 17 | Dec. 08 - 10:56 |
| File 7 | 17 | May 27 - 23:01 |
| File 8 | 8 | Dec. 13 - 00:39 |
| File 9 | 8 | Dec. 09 - 14:14 |
| File 10 | 15 | Dec. 09 - 15:10 |
| Index | 10 | |
| Directory | 10 | |

Figure 1:
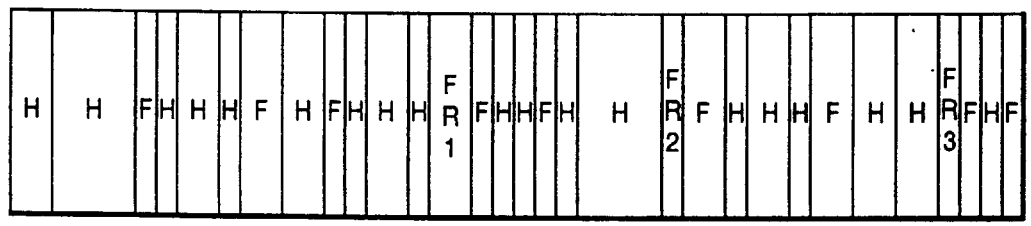
FIG. 1 illustrates files and free space distributed on a disk.
Figure 2:
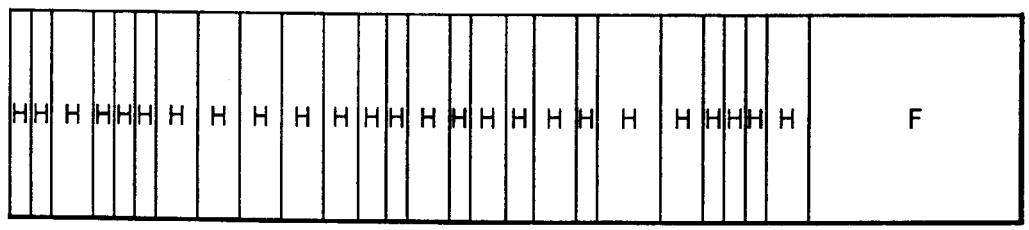
FIG. 2 illustrates the effect of prior art techniques on the disk of FIG. 1.
Figure 3:
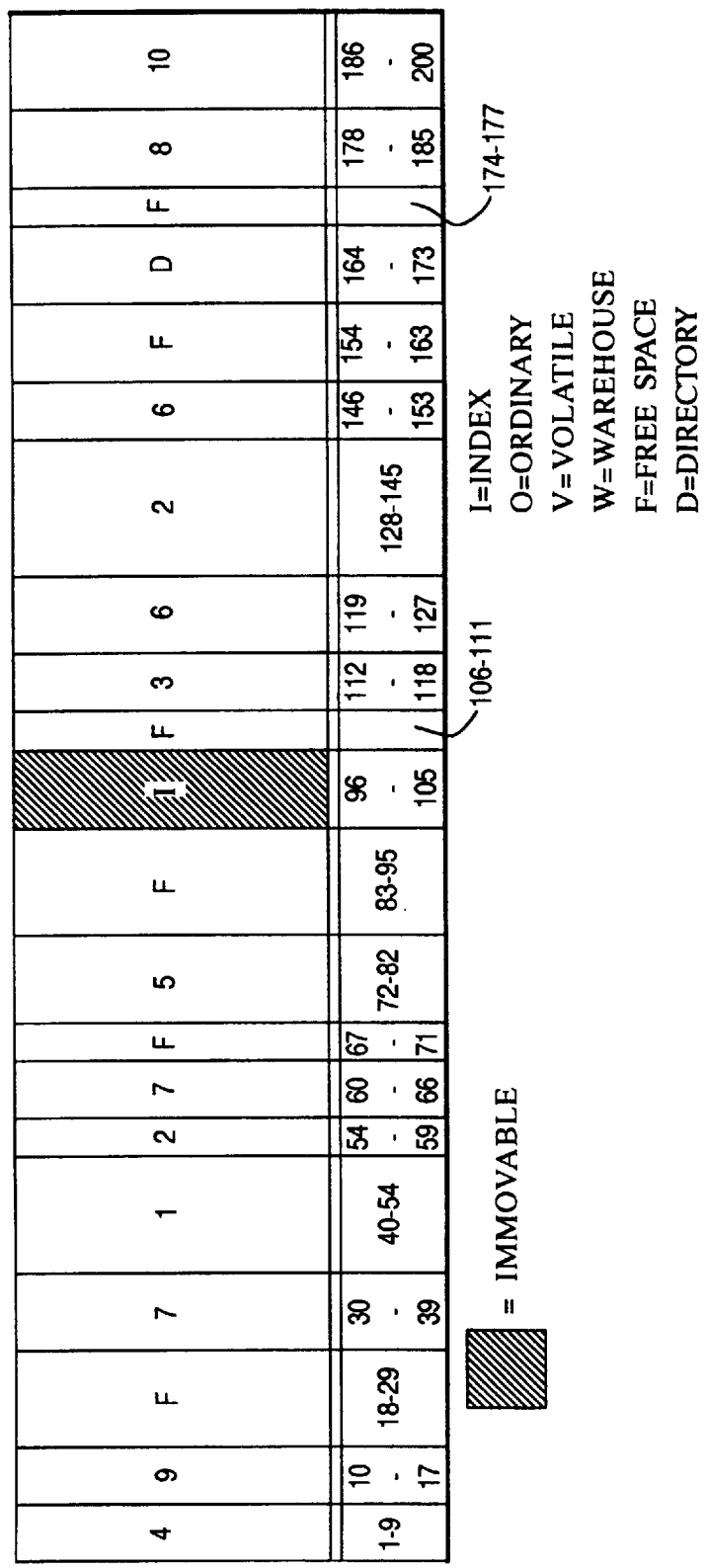
FIG. 3 illustrates the distribution of the files of Table II on a disk.

The files of Table II, some fragmented, some unfragmented, are shown as they may be distributed on a disk in FIG. 3. It can be seen that File 2 and File 7 are fragmented and that the free space is not contiguous.

The index file is created by the VMS operating system and is typically located in the approximate center of the disk. The location of the index file is maintained in memory. Generally, all operating systems include index files which may usually be positioned on the disk as desired by the system manager. The present invention does not move the index file from its location on the disk. Thus, in attempting to center the free space in the actively accessed region, the present invention must "work around" the index file. Certain other files are not moved from their disk locations by the present invention. Files which are open when the invention is active are not moved. Other examples of immovable files are so-called hidden files associated with copy-protected files and system files. The bit map is also immovable. In general, files which would be adversely affected by movement or files whose movement would affect system operation are not moved.

Directory files contain the directory and subdirectory tree structure for ownership of all files. As noted above, warehouse files are those which have not been accessed for a first predetermined number of days. The last time a file was accessed may be determined in accordance with a VMS facility known as volume retention dates. By enabling this volume retention date function on a disk device, it is possible to determine how much time has elapsed since the last time a given file was accessed. Other operating systems have similar functions generally known as date of last access functions. Although this first predetermined number is generally chosen in accordance with system requirements related to disk activity, in a preferred embodiment, the predetermined number of days is chosen to be about eight days, although the invention is not limited in this respect. Thus, if the present invention were implemented on December 13 at 23:00 (11:00 p.m.), Files 1, 3, 5 and 7 would be determined to be warehouse files.

Volatile files are files created within a second predetermined time period prior to the present time. Volatile files can be recognized by examining the create date in the file header block. Again, like the first predetermined time period, this second time period will be determined in accordance with system requirements. In a preferred embodiment, the second predetermined time period is chosen to be about 72 hours, although the invention is not limited in this respect. Thus, if the present invention were implemented on December 13 at 23:00, Files 2, 4, and 8 would be determined to be volatile files. Statistically, it is these volatile files which are most likely to be accessed at any given time. Finally, ordinary files are files which are accessed on a regular basis and do not meet any of the above criteria. Free space is disk blocks which are unused.

When the present invention is initiated, it scans the disk device to be defragmented and collects data on file size, type, number of fragments, and free space distribution. In the preferred embodiment, the disk scan moves from LBN 0 to LBN end. If the warehouse files are to be stored at the front end of the disk, the disk scan would preferably move from LBN end to LBN 0. During the scan, the data collected is used to determine how much disk space will be necessary for each above-described file category. By determining how much disk space is required for each file category, a manner of intelligently distributing the files such that the free space will be located in the approximate center of the actively accessed portion is developed.

Figure 4:
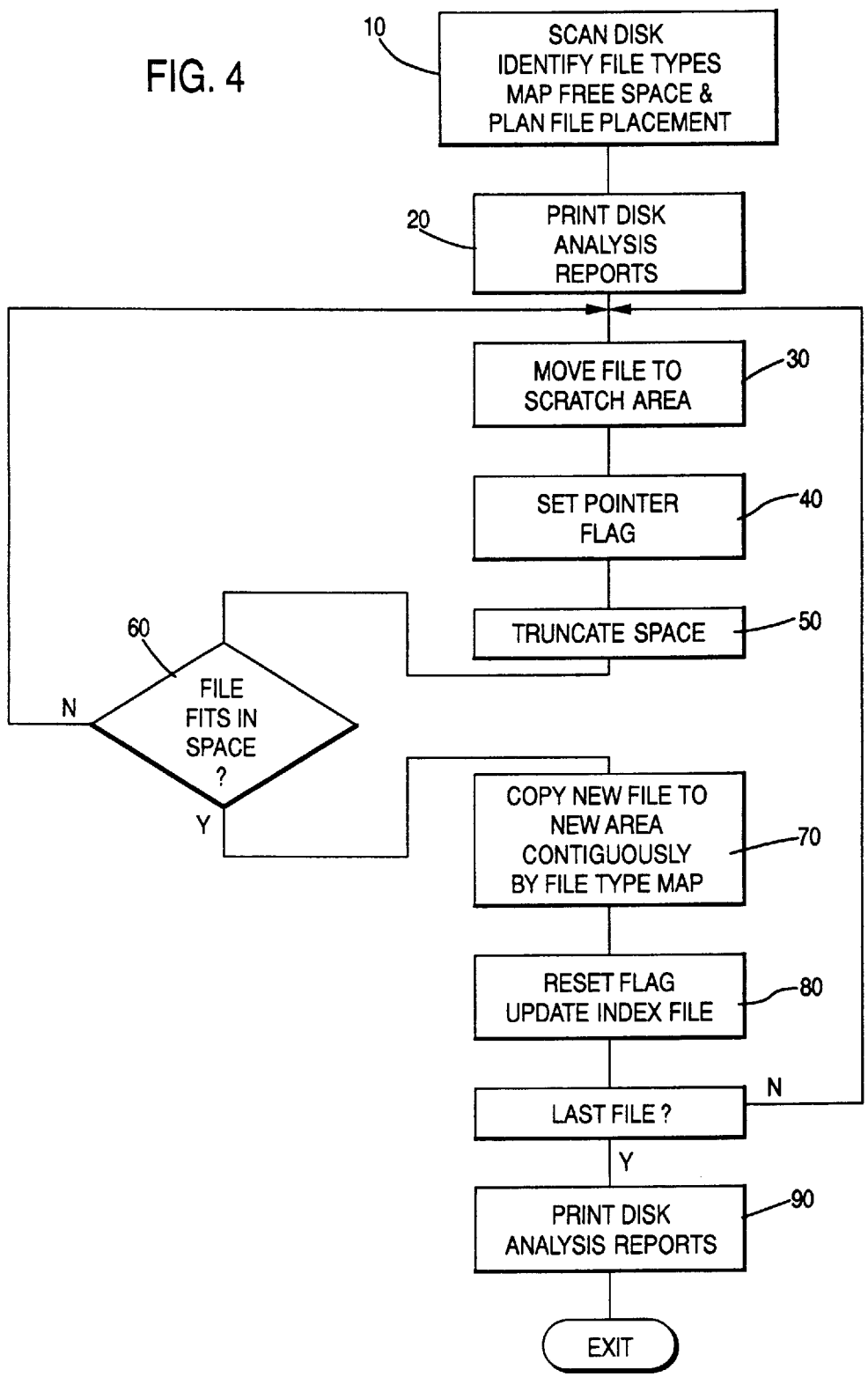
FIG. 4 is a flow chart illustrating the method of the present invention.

The method of the present invention will be explained with reference to FIG. 4. In the preferred embodiment, the method for making files contiguous is consistent with normal file movement under VMS. In general, the method of making files contiguous should be consistent with the normal file movement operation under the operating system being utilized. As indicated at step 10, the invention begins by scanning the disk and identifying the file types present thereon. The available free space is also mapped. By determining the file types and sizes, the file placement of the subsequent steps may be planned. In step 20, disk analysis reports are printed so that the system manager, for example, may obtain a picture of the disk file distribution. Typical information which may be printed includes the total disk space, the total disk space used, the total free space, the number of each of the various file types, and the number of fragmented files. This printed analysis is not a critical feature of the present invention, but serves to give an overall picture of disk file structure. The printed information may be in numeric form or displayed graphically.

At step 30, the invention begins file movement. Starting at the beginning of the disk (LBN 0), the first file is copied to a scratch area. The scratch area is free space on the target disk or on another device. Preferably, the scratch area is free space on another disk. After the file has been copied, a pointer flag is set at step 40. This pointer flag serves to point to the copied file and prevents an interruption such as a power failure from resulting in a file which is later unable to be located. At step 50, the space the copied file occupied is truncated and control passes to step 60 in which the invention searches for a file that will both fit into this space contiguously and in accordance with the file type map generated during the disk scan. Truncate as used herein refers to the deallocation of space such that the operating system recognizes that the space is unallocated. Contiguity as used herein refers to the positioning of a file physically on a disk in sequential LBN order. Both the scratch space and the disk are searched for files to fit in the space. In the preferred embodiment, the largest file in accordance with the file type map is moved into the space. This is generally to prevent the possibility of running out of disk space as the back of the disk is reached.

The file type map utilizes the information gathered during the disk scan regarding file size and type to determine how the files should be distributed on the disk. Again, as described above, the invention attempts to center free space in the actively accessed region and position volatile files contiguous therewith. Ordinary files, directory files, and the index file are positioned on either, side of the volatile files. This will be illustrated in more detail below.

If a file is found that fits into the truncated space contiguously, it is copied thereto at step 70. Then, at step 80, the pointer flag is reset and the index file is appropriately updated with the new file location. If no fit is found, the next file is copied out and the space is again truncated. This truncation creates a larger hole and the invention again searches for a file to fit within this new larger space.

This procedure continues until the last file has been moved, at which time control passes to step 90. At step 90, disk analysis reports are printed. These reports are similar to those printed at step 20 and provide an indication to the system manager of the current disk status.

An important feature of the file movement is that it attempts to consolidate all the free space on the disk. (Free space may not, however, be totally consolidated due to randomly distributed immovable files.) If, for example, free space is 20% of the disk, the invention will attempt to center space in the active 80% area. Volatile files are generally placed on either side of the free space. The distribution of immovable files may, for example, limit the placement of volatile files to only one side of the free space. If volatile files are statistically most likely to be accessed or deleted soon and new file creations will occur in free space, the read/write head movement can be localized by concentrating its activity in one area of the disk.

The present invention will now be explained with reference to the files of Tables I and II shown distributed on a disk in FIG. 3. Based on the results of an initialization on December 13 at 23:00, the disk scan would determine that warehouse files occupy 50 disk blocks and that there are 50 disk blocks of free space. This means that there are 150 disk blocks in the actively accessed region. Since there are 50 blocks of free space, the file type map will attempt to substantially center the free space within this actively accessed region or at blocks 51–100. In addition, there are 10 disk blocks of index files. While these block positions may not be adhered to faithfully in a given initialization, they serve as guidelines for positioning the files.

A disk scan initiated at 23:00 on December 13 would determine that files 1, 3, 5, and 7 satisfy the criteria of warehouse files and that the total number of disk blocks occupied by these files is 50 or ¼ (25%) of the disk. Since these files are to be moved to the back of the disk the file type map will position warehouse files, to the extent possible, at disk blocks 151–200 or from 75 to 100% of the disk. Thus, the actively accessed region would constitute disk blocks 1–150 or from 0–75% of the disk.

The disk scan would further determine that there are 50 disk blocks of free space, or ¼ (25%) of the disk. The file type map will substantially position the free space, to the extent possible, in the center of the actively accessed region or at disk blocks 51–100 (25 to 50% of the disk). However, as described below, the scan will also find that the immovable index file is positioned at blocks 96–105 and the file type map will note that no free space or other file types may be allocated to these disk blocks. "Substantially" is used herein in recognition that due to immovable files, for example, it may not be possible to strictly adhere to the file type map as described below.

The disk scan would also determine that files 2, 4, and 8 are volatile files which must be positioned contiguous with the free space. The total number of disk blocks occupied by volatile files is 40 or 20% of the disk. Since, as suggested by the overlap noted above, the free space will be contiguous with the index file at one end, the file type map will attempt to position the volatile files at the other end of the free space or at disk blocks 11–50.

Figure 7:
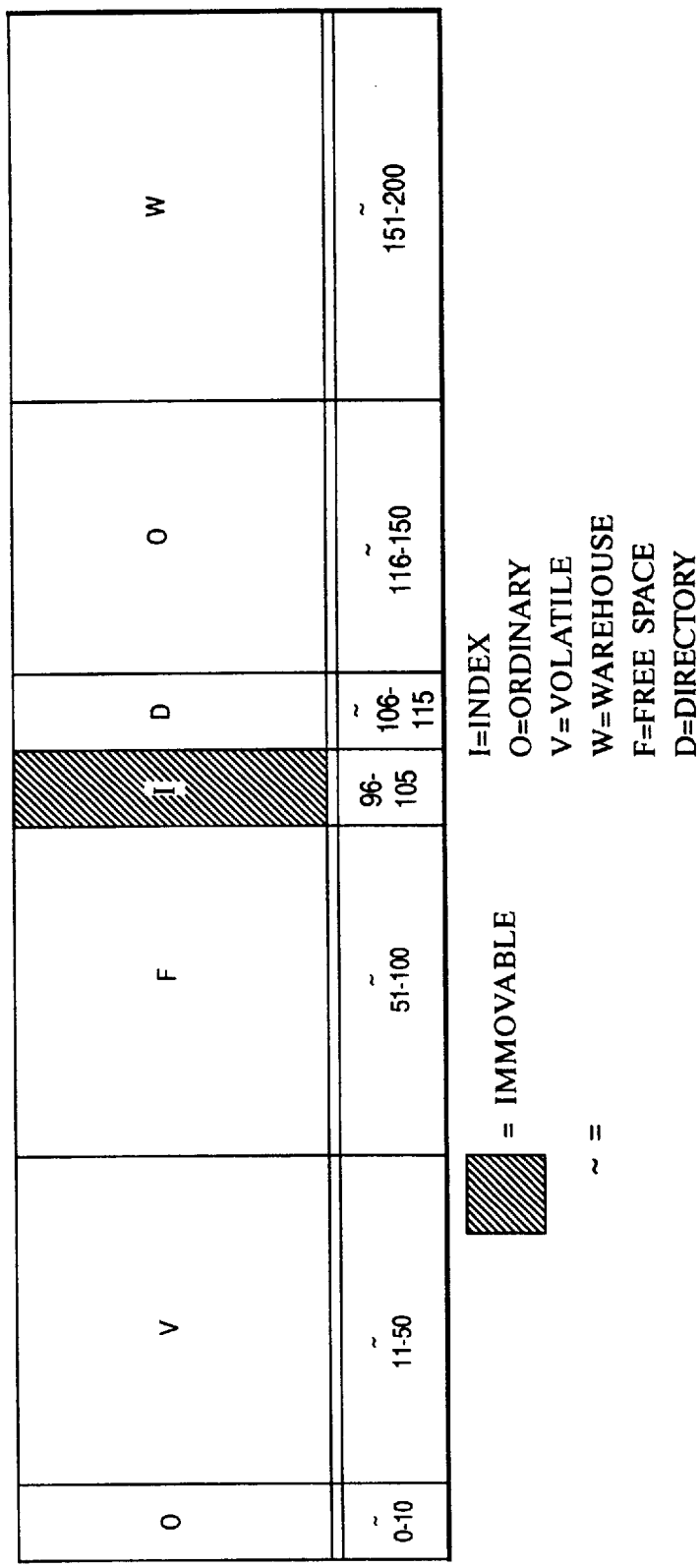
FIG. 7 illustrates a file type map generated during a disk scan in accordance with the present invention.

The disk scan would also determine that files 6, 9 and 10 are ordinary files and that the total number of disk blocks occupied by these files is 40 or ⅕ (20%) of the disk. The directory file would be determined to occupy 10 disk blocks and in the preferred embodiment, would be placed contiguous with the index file or at disk blocks 106–115. The file type map would position the ordinary files in the remaining disk blocks. The file type map generated by the above-described disk scan is illustrated in FIG. 7. The index file I is cross-hatched to indicate that it is immovable. In positioning the files utilizing the algorithm described in FIG. 4, the present invention attempts to adhere to this file type map to the extent possible.

With reference to FIG. 3, file 4 is the first file moved to scratch space and the space file 4 occupied is truncated, thereby opening 9 disk blocks at the front of the disk. In accordance with the algorithm, the invention will search the disk and scratch space for a file which fits in the open space and is consistent to the extent possible with the file type map. File 9 is an ordinary file consisting of 8 disk blocks which fits into the truncated space. In accordance with the invention, file 9 would then be moved to this space as shown in FIG. 8.

Next, the space which previously held file 9 is truncated leaving an open space of 21 blocks (8 blocks of newly truncated, 1 block remaining from previous truncated space and 12 free blocks). The present invention will now search for a volatile file or a very small ordinary file to occupy this space. Since the smallest remaining ordinary file is 15 disk blocks, placement of an ordinary file in the open space would be inconsistent with the file type map. File 4 is a volatile file of 9 disk blocks and file 8 is a volatile file of 8 disk blocks. Both satisfy the file type map and both would fit in the open space. However, as noted above, in the preferred embodiment, file 4 would be moved since it is the larger file. The positioning of file 4 is shown in FIG. 8.

Next, file 7 is unfragmented and written contiguously to scratch space. The first fragment (left in FIG. 3) of file 7 plus the remaining open space is truncated to create an opening of 22 blocks. File 8 is a volatile file which is consistent with the file type map and would fit in the open space. Thus, file 8 would be positioned as shown in FIG. 8.

Next, file 1 is written to scratch space. The open space is truncated and an opening of 29 disk blocks is created. (Size of file 1 and 14 blocks from previous truncated space). File 2 is a volatile file consistent with the file type map and which fits in the opening. Thus, file 2 would be made contiguous and would be positioned as shown in FIG. 8.

Next, the the invention will attempt to consolidate free space since no more volatile files remain. The invention would attempt to write sufficient files to scratch space to consolidate the free space, in this example, 50 disk blocks. Thus, in the present example, since the last block of volatile files is at block 48, the invention would attempt to free blocks 49–98. However, the immovable index file occupies blocks 96–105. Thus, blocks 96–98 cannot be freed and non-contiguous free space will be generated. However, it is apparent that, for the most part, free space has been made contiguous and substantially positioned in accordance with the file type map. This is shown in FIG. 8.

Next, file 3 is written to scratch space. This space is truncated and creates an open space of 13 blocks (7 blocks of file 3 and 6 blocks of free space). As noted, the directory file is substantially positioned contiguous with the index file in a preferred embodiment and thus file D is moved as shown in FIG. 8.

The remaining files are moved and positioned in accordance with the procedures outlined and will not be discussed in detail here. The end result of the procedure yields a disk with the files as distributed in FIG. 8. The non-contiguous free space may be positioned contiguous to the warehouse files as shown but this is not critical.

In summary, a file type map is generated during an initial disk scan. Files are distributed on the disk to the extent possible, in accordance with this file type map. Implementation of the above-described routine is straightforward and will be apparent to those skilled in the art.

Figure 5:
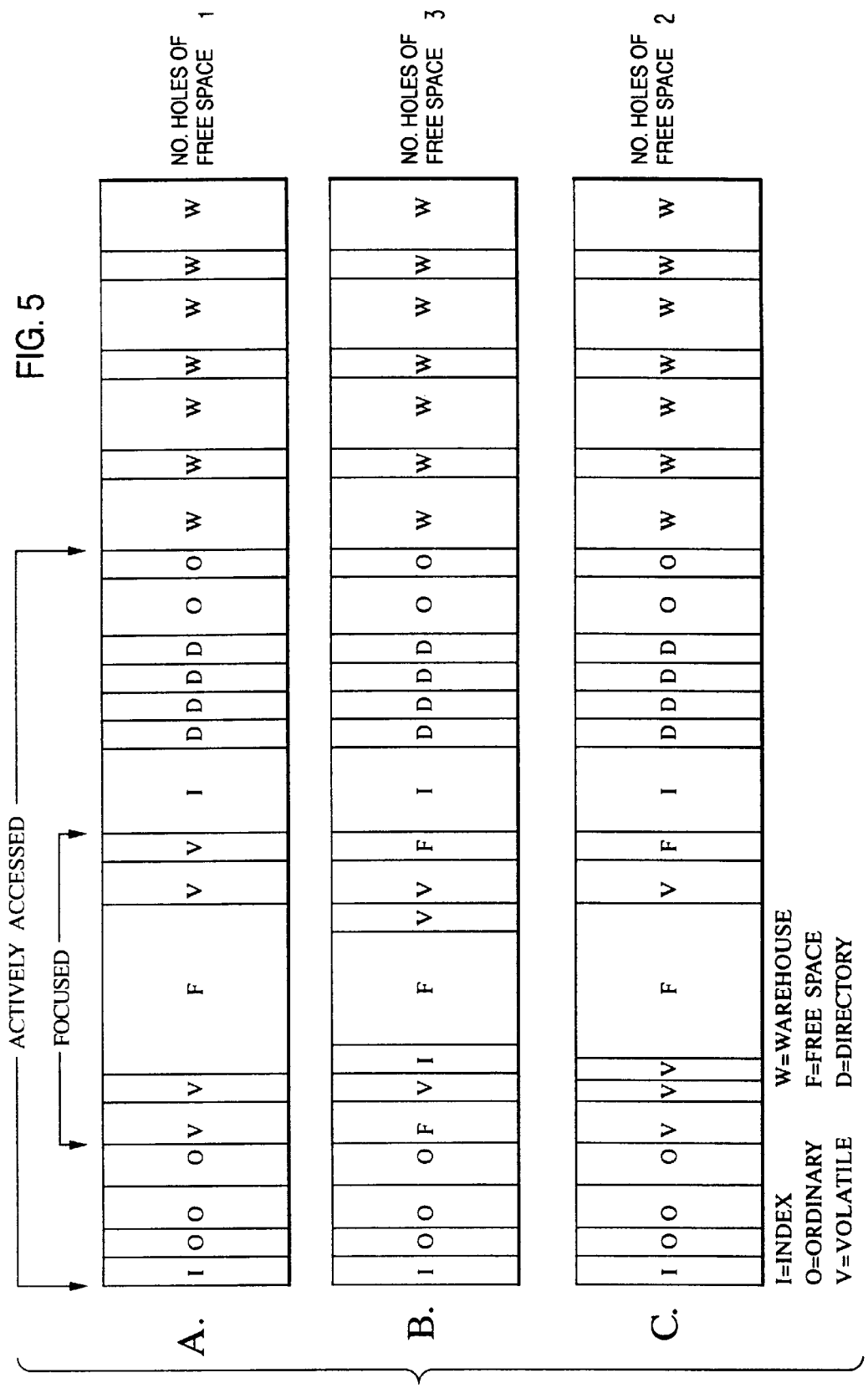
FIG. 5 illustrates the reduced head movement in accordance with the file distribution of the present invention.

FIG. 5 illustrates how the present invention focuses head movement. In FIG. 5B volatile files have been deleted and then recreated, the net result being that the number of free space holes increases from 1 to 3. When alternate volatile files are again deleted and recreated as shown in FIG. 5C, it shows that free space holes have actually reduced from 3 to 2. These figures, taken from actual runs demonstrate that (1) by focusing head movement average head seek time can be reduced; and (2) despite user activity the actively accessed portion of the disk remains constant.

Figure 6:
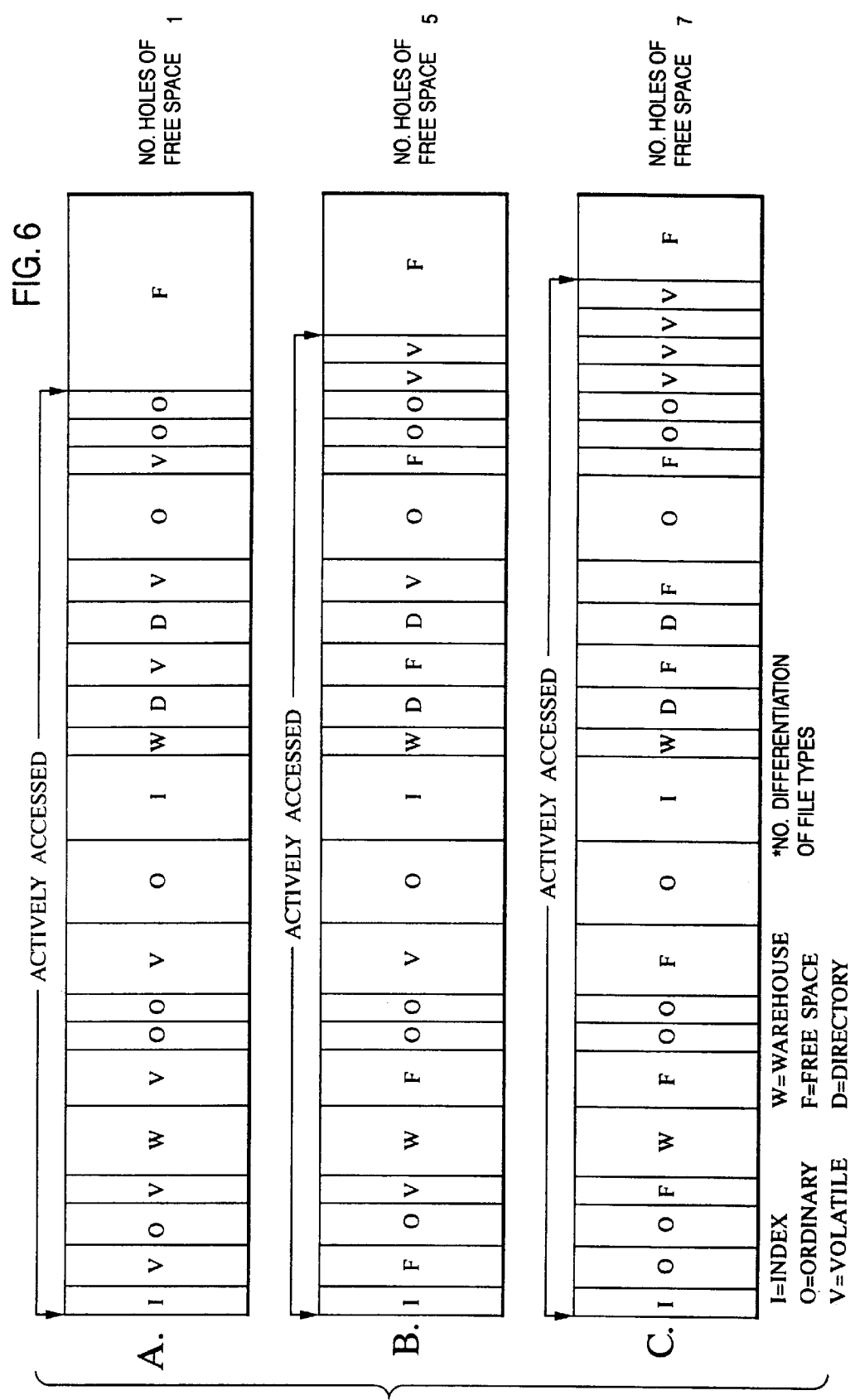
FIG. 6 illustrates head movement in accordance with prior art file distribution.

Conversely, the backup model (FIG. 6) shows that failure to differentiate between files types and failure to intelligently position files leads to (1) more rapid degradations of the disk structure, and (2) rapid fragmentation of free space; and (3) the actively accessed portion of the disk increases over time.

In FIG. 6B every other volatile file has been deleted and recreated. The result is the number of free space "holes" have increased and the actively accessed portion of the disk has increased.

In FIG. 6C another pass of deletions and recreations again causes more fragmented free space and more disk area to be covered by the read/write heads. Eventually, the large piece of contiguous free space is consumed and the next file to be created will be fragmented since it must use the smaller pieces of free space.

The invention has been described in detail in connection with the preferred embodiments. These embodiments, however, are merely for example only, and the invention is not limited thereto. It will be easily understood by those skilled in the art that other variations and modifications may easily be made within the scope of this invention as defined by the appended claims.

I claim:

1. A method of organizing a magnetic storage medium, said magnetic storage medium having free space and a plurality of files distributed thereon, said magnetic storage medium having a first end and a second end and a plurality of storage blocks, said plurality of storage blocks being arranged between the first and second ends, the method including the steps of:

classifying the plurality of files located on the magnetic storage medium into a predetermined number of categories based upon the time elapsed since the file was last accessed, said predetermined number of categories including warehouse files, said warehouse files comprising those files which have not been accessed for a first predetermined period of time; and moving substantially all of the warehouse files from a first location on the magnetic storage medium to a second location at one of said ends of the same magnetic storage medium using the memory of only that same magnetic storage medium.

2. A method of organizing a magnetic storage medium, said magnetic storage medium having a plurality of files and free space distributed thereon, the method including the steps of:

classifying the plurality of files located on the magnetic storage medium into a predetermined number of categories based upon the time elapsed since the file was last accessed; and using the memory of the single magnetic storage medium to re-position each of the plurality of files and the free space on that magnetic storage medium according to the category in which the file is classified.

3. A method of organizing a magnetic storage medium according to claim 2 wherein said step of positioning includes the step of substantially consolidating the free space distributed on the magnetic storage medium.

4. A method of organizing a magnetic storage medium according to claim 2 wherein the step of classifying said plurality of files includes the step of classifying said files into categories according to functional characteristics of the files.

5. A method of organizing a magnetic storage medium according to claim 4 wherein said categories according to functional characteristics include an index file and directory files.

6. A method of organizing a magnetic storage medium according to claim 2 wherein said categories based upon the time elapsed since the file was last accessed include warehouse files, said warehouse files comprising those files which have not been accessed for a first predetermined time period.

7. A method of organizing a magnetic storage medium according to claim 6, said magnetic storage medium having a first end and a second end and a plurality of storage blocks, said plurality of storage blocks being arranged between the first and second ends, wherein said step of positioning includes the step of substantially positioning warehouse files at one of said ends of the magnetic storage medium.

8. A method of organizing a magnetic storage medium according to claim 7 further comprising the step of:

defragmenting a warehouse file located on a magnetic storage area while repositioning said warehouse file on said magnetic storage medium using only the free space of the magnetic storage medium.

9. A method of organizing a magnetic storage medium according to claim 7 wherein said categories based upon the time elapsed since the file was last accessed further include volatile files created within a second predetermined time period.

10. A method of organizing a magnetic storage medium according to claim 9 wherein said positioning step includes the step of substantially consolidating the free space on the magnetic storage medium and the step of substantially positioning said volatile files contiguous to said consolidated free space.

11. A method of organizing a magnetic storage medium according to claim 10 further comprising the steps of:

defragmenting a warehouse file while positioning said warehouse file on said magnetic storage medium; and defragmenting a volatile file while positioning said volatile file contiguous to said consolidated free space.

\* \* \* \* \*